(12) United States Patent
Chavez et al.

(10) Patent No.: US 7,835,427 B1
(45) Date of Patent: Nov. 16, 2010

(54) MULTIPLEXED ARCHITECTURE FOR SIMULTANEOUS TRANSMISSION AND RECEPTION

(75) Inventors: Carlos J. Chavez, Marion, IA (US); Robert Joseph Frank, Cedar Rapids, IA (US); Michael R. Vagher, Cedar Rapids, IA (US); Carlen R. Welty, Solon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 778 days.

(21) Appl. No.: 11/731,798

(22) Filed: Mar. 30, 2007

(51) Int. Cl.
*H04B 1/38* (2006.01)
(52) U.S. Cl. .................. 375/219; 375/222; 375/132
(58) Field of Classification Search ......... 375/219–222, 375/130, 132–133
See application file for complete search history.

(56) References Cited

U.S. PATENT DOCUMENTS

| | | | |
|---|---|---|---|
| 4,383,323 A | | 5/1983 | Timor |
| 4,688,251 A | | 8/1987 | Citron et al. |
| 4,970,479 A | * | 11/1990 | Landt et al. .................. 333/101 |
| 5,329,548 A | * | 7/1994 | Borg ........................... 375/135 |
| 5,408,260 A | * | 4/1995 | Arnon ......................... 725/106 |
| 5,422,952 A | | 6/1995 | Kennedy et al. |
| 5,625,641 A | | 4/1997 | Takakusaki |
| 5,715,236 A | | 2/1998 | Gilhousen et al. |
| 5,757,767 A | | 5/1998 | Zehavi |
| 5,781,582 A | | 7/1998 | Sage et al. |
| 5,832,026 A | | 11/1998 | Li |
| 5,914,933 A | | 6/1999 | Cimini et al. |
| 5,930,244 A | | 7/1999 | Ariyoshi et al. |
| 5,943,361 A | | 8/1999 | Gilhousen et al. |
| 6,049,535 A | | 4/2000 | Ozukturk et al. |
| 6,088,337 A | | 7/2000 | Eastmond et al. |
| 6,169,761 B1 | | 1/2001 | Marcoccia et al. |
| 6,246,698 B1 | | 6/2001 | Kumar |
| 6,320,896 B1 | | 11/2001 | Jovanovich et al. |
| 6,498,820 B1 | | 12/2002 | Thomson et al. |
| 6,519,262 B1 | | 2/2003 | Stephens et al. |
| 6,522,650 B1 | | 2/2003 | Yonge et al. |
| 6,658,063 B1 | | 12/2003 | Mizoguchi et al. |
| 6,671,331 B1 | | 12/2003 | Sakuma |
| 6,686,829 B1 | | 2/2004 | Hohberger et al. |
| 6,693,580 B1 | * | 2/2004 | Wehling ....................... 342/45 |
| 6,721,331 B1 | | 4/2004 | Agrawal et al. |
| 6,788,729 B1 | * | 9/2004 | Posti ........................... 375/133 |
| 6,810,258 B1 | * | 10/2004 | Vialen ......................... 455/450 |
| 6,836,469 B1 | | 12/2004 | Wu |
| 6,904,282 B2 | | 6/2005 | Cooper |
| 6,917,606 B2 | | 7/2005 | Sashihara |
| 7,033,322 B2 | * | 4/2006 | Silver ......................... 600/486 |
| 7,088,734 B2 | | 8/2006 | Newberg et al. |
| 7,142,521 B2 | | 11/2006 | Haugli et al. |
| 7,292,617 B2 | | 11/2007 | Beasley et al. |

(Continued)

*Primary Examiner*—Emmanuel Bayard
(74) *Attorney, Agent, or Firm*—Matthew J. Evans; Daniel M. Barbieri

(57) ABSTRACT

A system for simultaneously transmitting and receiving signals in a frequency hopping system. The system includes a multiplexor configured to filter a plurality of frequency hopping message pulses based on a frequency associated with each pulse, a plurality of transceivers configured to receive the pulses from the multiplexor, and a modem configured for simultaneous transmission and reception whereby transmission of the pulses are isolated from potentially received pulses by selecting a specific sub-band and transceiver corresponding to the specific sub-band through which to transmit each pulse.

20 Claims, 3 Drawing Sheets

U.S. PATENT DOCUMENTS

| | | |
|---|---|---|
| 2002/0009067 A1 | 1/2002 | Sachs et al. |
| 2003/0012217 A1 | 1/2003 | Andersson et al. |
| 2003/0053469 A1 | 3/2003 | Wentink |
| 2004/0087308 A1* | 5/2004 | Tirkkonen et al. .......... 455/445 |
| 2004/0203460 A1 | 10/2004 | Hasegawa |
| 2005/0013386 A1 | 1/2005 | Ojard |
| 2005/0030914 A1 | 2/2005 | Binzel et al. |
| 2005/0242990 A1 | 11/2005 | Lawrence et al. |
| 2005/0254560 A1 | 11/2005 | Huang |
| 2006/0018391 A1 | 1/2006 | Cho et al. |
| 2006/0045053 A1* | 3/2006 | Erlich et al. ................. 370/338 |
| 2007/0238483 A1* | 10/2007 | Boireau et al. ........... 455/553.1 |
| 2007/0282908 A1* | 12/2007 | Van der Meulen et al. ...................... 707/104.1 |

* cited by examiner

MULTIPLEXED ARCHITECTURE FOR SIMULTANEOUS TRANSMISSION AND RECEPTION

BACKGROUND OF THE INVENTION

The present invention relates generally to the field of frequency hopping spread spectrum radio transmission. More particularly, the present invention relates to a system and method for simultaneous transmission and reception of signals during frequency hopping spread spectrum radio transmission.

Frequency hopping spread spectrum (FHSS) is a method of transmitting radio signals by rapidly switching a carrier among many frequency channels using a pseudorandom sequence known to both transmitter and receiver. Spread spectrum signals are highly resistant to noise and interference, are difficult to intercept, and can share a frequency band with many types of conventional transmissions with minimal interference.

In a frequency hopping system, a transmitter "hops" between available frequencies according to a specified algorithm, which can be either random or preplanned. The transmitter operates in synchronization with a receiver, which remains tuned to the same center frequency as the transmitter. A short burst of data is transmitted on a narrow frequency band. Then, the transmitter tunes to another frequency and transmits again. The receiver thus is capable of hopping its frequency over a given bandwidth several times a second, receiving on one frequency for a certain period of time, then hopping to another frequency and receiving again. Frequency hopping requires a much wider bandwidth than is needed to transmit the same information using only one carrier frequency.

During transmission, a frequency hopping transceiver generates a signal that may be several orders of magnitude stronger than any received signals. The transmitted signal may be powerful enough to make simultaneous reception of received signals impossible, particularly where the received signal is received on the same or a nearby frequency as the signal being transmitted. However, simultaneous transmission and reception of signals in a frequency hopping system remains desirable.

Accordingly, there is a need for a system and method allowing for simultaneous transmission and reception of signals in a frequency hopping system. Yet further, there is a need for such a system and method configured to assign a frequency to one of a plurality of transceivers based on a frequency of a second transmitter upon which a signal is being received. There is further a need for such system and method wherein the one of a plurality of transceivers is selected based on a desired isolation level.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to a system for simultaneously transmitting and receiving signals in a frequency hopping system. The system includes a multiplexor configured to filter a plurality of frequency hopping message pulses based on a frequency associated with each pulse, a plurality of transceivers configured to receive the pulses from the multiplexor, and a modem configured for simultaneous transmission and reception whereby transmission of the pulses are isolated from potentially received pulses by selecting a specific sub-band and transceiver corresponding to the specific sub-band through which to transmit each pulse.

Another embodiment of the invention relates to a system for simultaneously transmitting and receiving signals in a frequency hopping system. The system includes a multiplexor means configured to filter a plurality of frequency hopping message pulses based on a frequency associated with each pulse, a plurality of transceiving means configured to receive the pulses from the multiplexor, and a modem means configured for simultaneous transmission and reception whereby transmission of the pulses are isolated from potentially received pulses by selecting a specific sub-band and transceiver corresponding to the specific sub-band through which to transmit each pulse.

Yet another embodiment of the invention relates to a computer implemented method for simultaneously transmitting and receiving signals in a frequency hopping system. The method includes transmitting a frequency hopping message pulse on a frequency associated with the transmitted pulse, receiving a frequency hopping message pulse on a different frequency associated with the received pulse during the transmission of the transmitted pulse, and assigning a frequency to the transmitted pulse based on a frequency associated with the received pulses by selecting a specific sub-band and transceiver corresponding to the specific sub-band.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
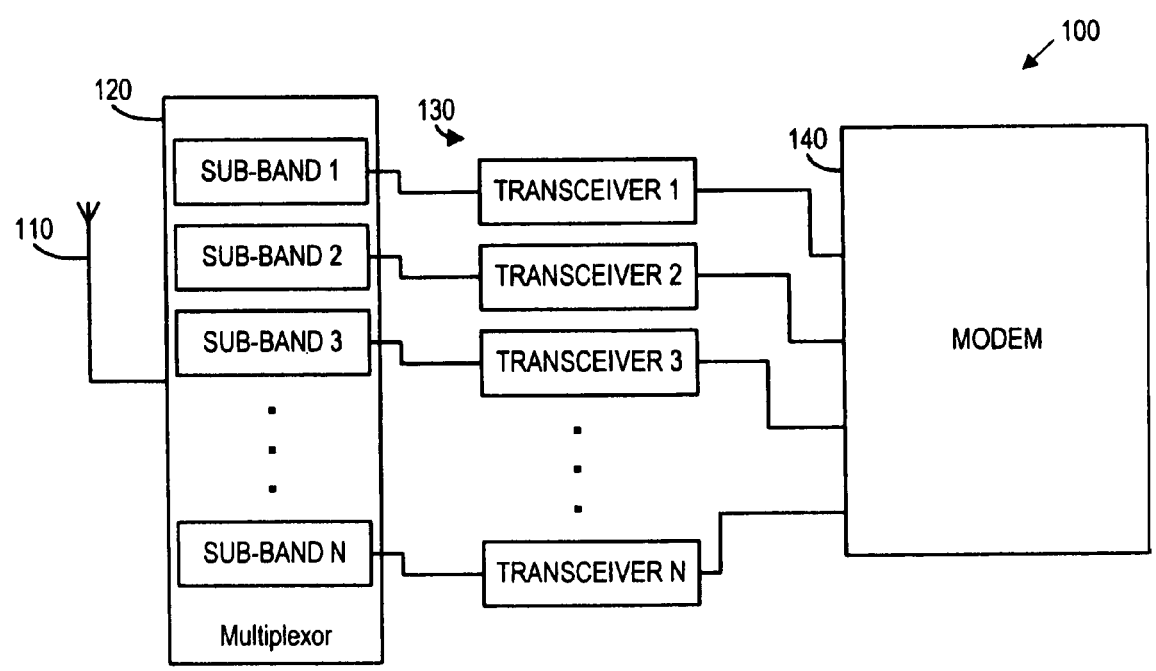
FIG. 1 is a block diagram illustrating a multiplexed architecture configured for simultaneous transmission and reception of wireless signals, according to an exemplary embodiment.

Before describing in detail the particular improved system and method, it may be observed that the invention includes, but is not limited to, a novel structural combination of conventional data/signal processing components and communication circuits, and not in the particular detailed configurations thereof. Accordingly, the structure, methods, functions, control, and arrangement of conventional components and circuits have, for the most part, been illustrated in the drawings by readily understandable block representations and schematic diagrams in order not to obscure the disclosure with structural details which will be readily apparent to those skilled in the art, having the benefit of the description herein. Further, the invention is not limited to the particular embodiment depicted in the exemplary diagrams, but may be construed in accordance with the language in the claims.

Referring now to FIG. 1, a block diagram illustrating a multiplexed architecture 100 configured for simultaneous transmission and reception of wireless signals is shown, according to an exemplary embodiment. Architecture 100 is configured to improve reception of messages in a frequency hopping transmission system while the receiving terminal is concurrently transmitting.

Architecture 100 includes an antenna 110, a multiplexor 120, a plurality of transceivers 130, and a modulator/demodulator, or modem 140. Although a particular number of elements are shown in FIG. 1 in a particular configuration, it should be understood that architecture 100 may include more, less, and/or a different configuration of elements configured to provide the functionality described herein.

Antenna 110 may be any type of antenna configured to receive transmitted digital signals over a variety of frequencies. Multiplexor 120 may be any type of multiplexor configured to divide the signal received from antenna 110 in N sub-bands, where N is equal to the number of transceivers 130, and to provide isolation between each of the sub-bands. Each sub-band corresponds to one of the N transceivers 130. The multiplexor 120 acts as a filter separating the received or transmitted signals based on the frequency sub-bands.

Transceivers 130 may be any type of transceiver configured to be capable of receive or transmit functionality. Transceivers 130 may further be configured to transmit in a half-duplex fashion. Transceivers 130 are configured to be isolated from each other to minimize interference. By providing isolation between sub-bands of the total frequency hopping bandwidth, architecture 100 enables reception of a signal during a transmitted pulse. Reception is possible when the received signal is in a different sub-band from the transmitted pulse.

Transceivers 130 may be configured such that each transceiver is associated with a unique frequency or a unique group of several contiguous frequencies (a frequency sub-band). The associations may be stored and maintained by modem 140. The associated frequencies may further be fixed or variable. For example, modem 140 may be configured to narrow the frequency sub-bands associated with transceivers 130 based on a transmission power to provide greater isolation between transceivers 130. To illustrate, assuming a first sub-band of frequencies and a second sub-band of frequencies, modem 140 may configure the sub-bands to be separated by a certain number of frequencies, the number may be a function of the transmit power of architecture 100.

Modem 140 may be any standard modulator/demodulator configured to accept and process received signals from the plurality of transceivers 130. Modem 140 is further configured to send a modulated signal to one or more of the transceivers 130 while simultaneously processing received signals from one or more of transceivers 130.

Modem 140 is configured to include a digital signal processor 142 configured to implement the signal processing required to simultaneously receive signals while transmitting as described in detail below with reference to FIG. 3. Digital signal processor 142 may be implemented in hardware, such as an Application Specific Integrated Circuit (ASIC) or a programmable gate array (PGA), or in software using a digital signal processing processor.

Embodiments of the present invention may be practiced in a networked environment using logical connections to one or more remote computing systems having processors. Logical connections may include a local area network (LAN) and a wide area network (WAN) that are presented here by way of example, and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PC's, mini-computers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

Figure 2:
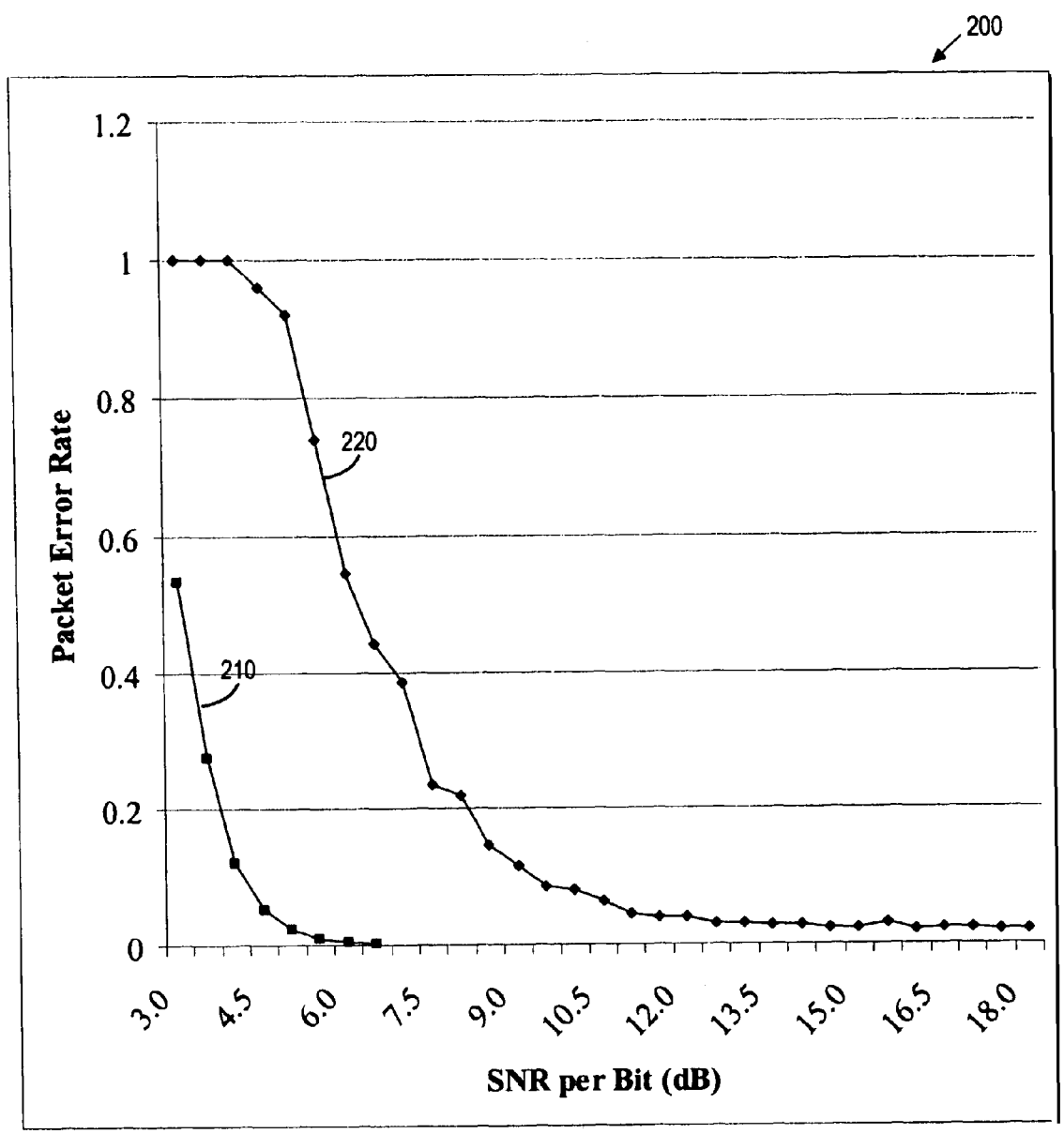
FIG. 2 is a graph illustrating the packet error rate (PER) vs. signal-to-noise ratio (SNR) per bit that is achieved using the multiplexed architecture of FIG. 1 for simultaneous transmission and reception, according to an exemplary embodiment.

Referring now to FIG. 2, a graph 200 illustrating the packet error rate (PER) vs. signal-to-noise ratio (SNR) per bit that is achieved using the multiplexed architecture 100 for simultaneous transmission and reception is shown, according to an exemplary embodiment. A first plot line 210 is configured to represent a simulated performance of a non-multiplexed terminal receiving a 2 Mbps low latency packet in an additive white Gaussian noise (AWGN) channel while transmitting a continuous stream of normal latency packets. A second plot line 220 represents a simulated performance of multiplexed architecture 100 using 2 sub-bands. The simulated performance shown assumes that perfect isolation is achieved between the sub-bands. The architecture 100 improves performance at 10% PER by approximately 5 dB. Further, while the non-multiplexed terminal exhibits a PER floor at approximately 2%, architecture 100 achieves 1% PER performance at less than 6 Db SNR per bit.

The graph depicted in FIG. 2 assumes perfect isolation between the sub-bands. This may not always be feasible. However, the frequencies may be allocated in two groups with significant spectral separation to provide near-perfect isolation. This separation may allow multiplexed architecture 100 with at least two sub-bands to achieve enough isolation to approach the performance represented by second plot line 220.

Figure 3:
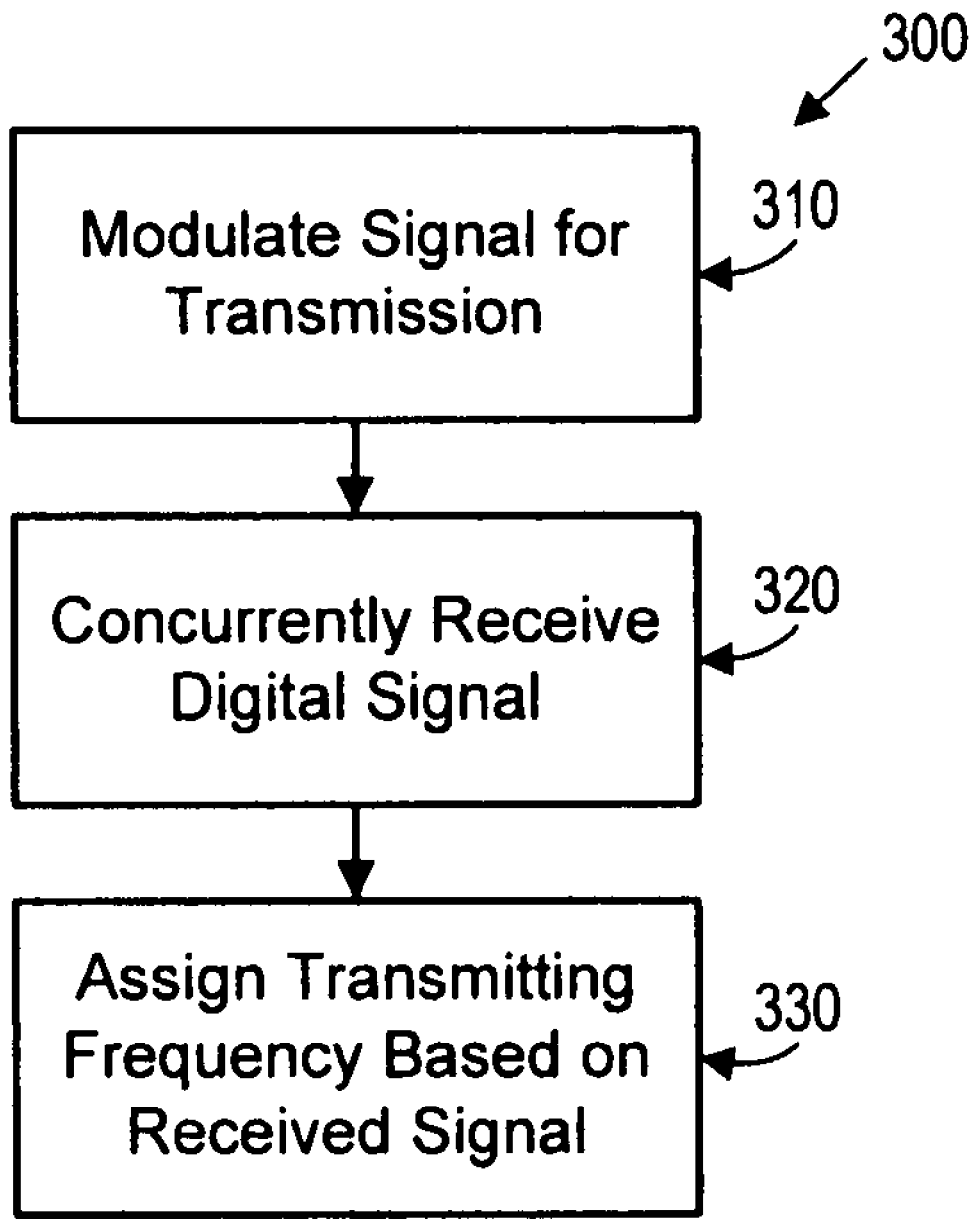
FIG. 3 is a flowchart illustrating a method for simultaneously receiving signals while transmitting in a frequency hopping transmission system, according to an exemplary embodiment.

Referring now to FIG. 3, a flowchart 300 illustrating a method for simultaneously receiving signals while transmitting in a frequency hopping transmission system is shown, according to an exemplary embodiment. The method may be implemented using hardware or software within modem 140.

In a step 310, modem 140 may be configured to modulate a message to be provided to a transceiver for transmission. Transmission may further include dividing the message to be sent into a plurality of pulses or dwells, wherein each pulse is configured to be transmitted on a pseudorandom frequency. Transmission may further include transmitting each pulse to one of transceivers 130 based on the pseudorandom frequency that is selected for the pulse and a frequency or band of frequencies uniquely associated with each of transceivers 130.

Transmission may further include commanding the transceiver 130 to transmit on a particular frequency within the sub-band for that transmitter. Commanding the transceiver 130 to transmit on a particular frequency may be used to facilitate isolation between transceivers. Each pulse or dwell is being sent on a pseudorandom frequency; accordingly, the isolated frequency will also be changed in real time.

In a step 320, occurring concurrently with step 310, modem 140 is configured to listen for, and receive messages through other transceivers 130 from those being utilized in step 310. The received messages may also be frequency hopping messages received on a plurality of pseudorandom frequencies.

In a step 330, modem 140 may be configured to perform forward error correction to allow for recovery of packets for which collisions have occurred by transceivers transmitting on the same frequency on which a pulse is currently or about to be received. Transmitted frequencies are generally chosen pseudo randomly such that collisions may occur.

It is important to note that although the steps in FIG. 3 are shown in a serial flowchart, these steps do not occur in any particular order and often would occur concurrently. It is an advantage of this system and method that pulses are simultaneously being received and transmitted.

It may be noted that although the flowcharts provided herein shows a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and logic to accomplish the various database searching steps, correlation steps, comparison steps, and decision steps. It may also be noted that the word "processor" as used herein and in the claims is intended to encompass implementations using one or more lines of software code, and/or hardware implementations, and/or equipment for receiving manual inputs.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such connection is properly termed "machine-readable medium." Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represents examples of corresponding acts for implementing the functions described in such steps.

While the detailed drawings, specific examples, and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A system for simultaneously transmitting and receiving signals in a frequency hopping system, comprising:
    a multiplexor configured to filter a plurality of frequency hopping message pulses based on a frequency associated with each pulse;
    a plurality of transceivers configured to receive the pulses from the multiplexor; and
    a modem configured for simultaneous transmission and reception, wherein the modem is further configured to select a specific sub band and one of the plurality of transceivers corresponding to the specific sub band through which to transmit each pulse, whereby transmission of the pulses are isolated from potentially received pulses.

2. The system of claim 1, wherein each of the plurality of transceivers is associated with a unique frequency sub band.

3. The system of claim 2, wherein the range of frequencies within the unique frequency sub band is variable.

4. The system of claim 2, wherein the modem is further configured to command the transceivers to transmit on an associated frequency.

5. The system of claim 4, wherein the associated frequency is selected to provide desired isolation between the transceivers.

6. The system of claim 5, wherein the desired isolation and associated frequency are determined as a function of current transmit power.

7. The system of claim 1, wherein the modem includes a digital signal processor configured to receive and process received signals while concurrently sending pulses to the plurality of transceivers for transmission.

8. A system for simultaneously transmitting and receiving signals in a frequency hopping system, comprising:
    a multiplexor means configured to filter a plurality of frequency hopping message pulses based on a frequency associated with each pulse;
    a plurality of transceiving means configured to receive the pulses from the multiplexor; and
    a modem means configured for simultaneous transmission and reception, wherein the modem means is further configured to select a specific sub band and one of the plurality of transceivers corresponding to the specific sub band through which to transmit each pulse, whereby transmission of the pulses are isolated from potentially received pulses.

9. The system of claim 8, wherein each of the plurality of transceiving means is associated with a unique frequency sub band.

10. The system of claim 9, wherein the range of frequencies within the unique frequency sub band is variable.

11. The system of claim 9, wherein the modem is further configured to command the transceivers to transmit on an associated frequency.

12. The system of claim 11, wherein the associated frequency is selected to provide isolation between the transceiving means.

13. The system of claim 12, wherein the provided isolation and associated frequency are determined as a function of current transmit power.

14. The system of claim 8, wherein the modem means includes a digital signal processing means configured to receive and process received signals while concurrently sending pulses to the plurality of transceiving means for transmission.

15. A computer implemented method for simultaneously transmitting and receiving signals in a frequency hopping system, comprising:

transmitting a frequency hopping message pulse on a frequency associated with the transmitted pulse;

receiving a frequency hopping message pulse on a different frequency associated with the received pulse during the transmission of the transmitted pulse; and assigning a frequency to the transmitted pulse based on a frequency associated with the received pulses by selecting a specific sub band and transceiver corresponding to the specific sub band.

16. The method of claim 15, wherein associating a frequency with a transmitted pulse includes providing the transmitted pulse to one of a plurality of transceivers, each transceiver being associated with a unique frequency sub band.

17. The method of claim 16, wherein the range of frequencies within the unique frequency sub band is variable.

18. The method of claim 16, wherein providing the transmitted pulse to one of a plurality of transceivers includes commanding the transceiver to transmit on a particular frequency within the frequency sub band.

19. The method of claim 15, wherein the associated frequency is selected to provide isolation between the transceivers.

20. The method of claim 19, wherein the provided isolation and associated frequency are determined as a function of current transmit power.

* * * * *